OPTICAL RADIATION PULSE CONTROL RECEIVER
Filed June 4, 1965
Fig. Ia
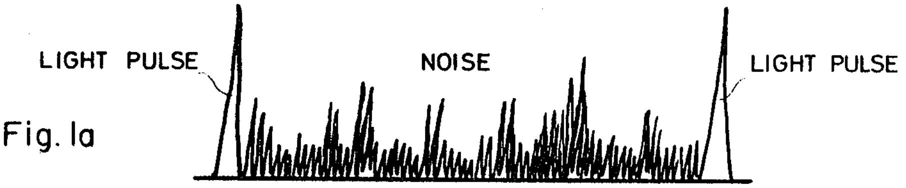
Fig. Ib
Fig. Ic
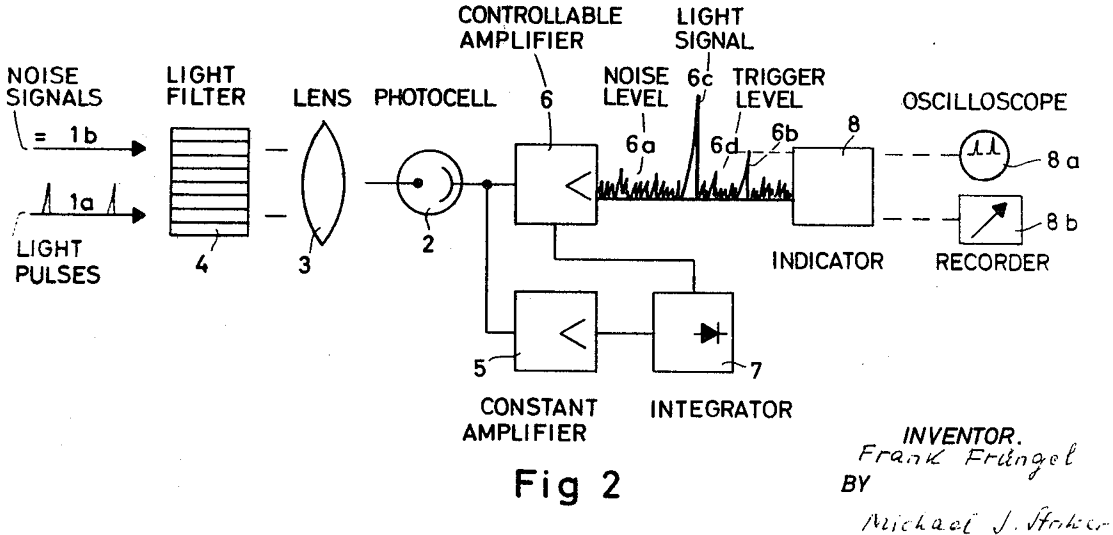
Fig 2
INVENTOR.
Frank Fruengel
BY
Michael J. Striker
Atty.

United States Patent Office 3,516,751
Patented June 23, 1970

3,516,751

OPTICAL RADIATION PULSE CONTROL RECEIVER

Frank Fruengel, Suelldorfer Landstr. 400, Hamburg-Rissen, Germany

Filed June 4, 1965, Ser. No. 461,282
Int. Cl. G01c 3/20, 3/08
U.S. Cl. 356—226 8 Claims

ABSTRACT OF THE DISCLOSURE

An arrangement for separating light signal pulses from background noise signals. A photosensitive element receives the mixture of the light signal pulses and the background noise signals, and converts these into corresponding electrical signals. The output of a photosensitive element is applied to both a constant gain amplifier and a controlled amplifier. The latter is controlled with the output from the constant gain amplifier, after rectification. A threshold indicating arrangement connected to the output of the controlled amplifier is set to indicate only signals above a predetermined threshold level. This level is made such that it is above the noise signal level, and thereby the indicating arrangement indicates only the light signal pulses, and excludes the backgroud noise signals.

The present invention relates to an optical radiation pulse control receiver. More particularly, the invention relates to a control receiver for low repetition frequency light pulses originating from spark or laser beams and subjected to illumination interference or noise of varying magnitude.

When irradiated with a steady light, all photoelectric or photoresponsive receiving elements generate noise which is superimposed on the D.C. output signals and the amplitude of which is proportional to the square root of the product of the irradiation intensity and the bandwidth of the amplifier connected to the output of the photoresponsive element. Light pulse receivers which are subjected to fluctuating daylight on which the signals are superimposed, are therefore desirably designed so that the brightest steady light that could possibly be incident on the receiver, together with the resultant noise, cannot actuate an indicator connected in the receiver for indicating received low frequency light.

During cloudy weather or at night, the noise is very much reduced and amplification may accordingly be increased. However, manual adjustment for increased amplification is usually extremely difficult if not impossible to achieve. In cloud ceilometers operating with light pulses, although the response should be insignificant during fine weather with bright illumination conditions, the noise simulates cloud to provide a false indication in the ceilometer, while on the other hand, a high degree of amplification is desirable, when the noise level is reduced during misty or dull weather or at night.

An object of the present invention is to provide automatic amplification control for receivers of the type responsive to low repetition frequency optical radiation pulses and subjected to illumination interference or noise.

In accordance with the present invention, the received light signals are utilized, not as a control parameter, but to maintain a constant amplitude of noise or interference signals. A noise amplifier and a controlled amplifier In accordance with the present invention, an optical radiation pulse control receiver subjected to illumination or light noise or interference of varying magnitude, comprises a photoresponsive receiving element responsive to individual light pulses and to light or illumination noise or interference for converting received light pulses and light interference or noise to corresponding electrical pulses or signals and corresponding interference or noise signals. A noise amplifiers and a controlled amplifier each responsive to both the pulse and interference signals are connected to the output of the photoresponsive element. The noise amplifier provides a constant amplification and produces a control voltage proportional to the magnitude of the noise or interference and the control voltage is applied to the controlled amplifier and controls the controlled amplifier to maintain the voltage level of the noise at the output of the controlled amplifier substantially constant. An indicator connected to the output of the controlled amplifier indicates the electrical signals corresponding to the light pulses thereby indicating received light pulses.

In order that the present invention may be readily carried into effect, it will now be described with reference to the accompanying drawing, wherein:

FIGS. 1*a*, 1*b* and 1*c* are graphic presentations of waveforms illustrating the relationship between the light pulses and the noise or interference; and FIG. 2 is a schematic block diagram of a preferred embodiment of the optical radiation pulse control receiver of the present invention.

FIG. 1*a* illustrates the waveform of light pulses and noise for darkness or low intensity illumination conditions in which strong light pulses and low intensity noise are evident. Despite the low level of the noise signals, the total signal level considerably exceeds the level of the light pulses because of the low repetition frequency of said light pulses.

FIG. 1*b* illustrates the waveform of light pulses and noise for daylight conditions in which the noise due to daylight is very intensive while the light pulses are practically lost in the noise. The signal to noise ratio is not sufficient in magnitude for reliable reception. Due to this fact, in prior art receivers, the indicator is relatively insensitive in order to respond to stronger pulses only, as shown by the waveform of FIG. 1*c*.

A measuring or indicating instrument utilizing a rectifier does not indicate the signals corresponding to the low repetition frequency effective light pulses, but indicates only the signals corresponding to the noise. A peak voltage indicator responds only to the signals corresponding to the light pulses provided that there is a considerable differentiation with respect to the signals corresponding to the noise.

The receiver of the present invention utilizes the principle that the voltage corresponding to the noise, after rectification, remains practically uninfluenced by the signals corresponding to the light pulses. In FIG. 2, a photoresponsive element of photocell 2, receives individual effective light pulses 1*a* in which comprise, for example, low repetition frequency light pulses of a duration of $10^{-5}$ to $10^{-8}$ second. The light pulses may comprise, for example, those originating from spark or laser beams. The photocell 2 also receives continuous light interference or noise 1*b* of varying intensity. The photocell 2 converts the received input light into electrical output signals of magnitude corresponding to the intensity of the received light. The light is focussed on the photocell 2 by a suitable mirror system and/or optical lens 3. The effect of stray light is reduced to a minimum by passing the light through a suitable honeycomb type light filter 4 or the like before it reaches the lens 3.

The electrical signals corresponding to the noise and the signals corresponding to the light pulses are simultaneously supplied to two amplifiers 5 and 6 having inputs connected to the output of the photocell 2. The amplifier 5 is linear and uncontrolled and functions as a very constant amplifier. The amplifier 6 is a controllable amplifier. The amplifier 5 amplifies the electrical signals corresponding to both the light pulses and the noise. The signals amplified by the amplifier 5 are supplied to an integrator 7 which may, for example, comprise a rectifier. The integrator 7 supplies a control voltage proportional to the noise to the amplifier 6, where the control voltage controls said amplifier so that the output voltage of the said amplifier, which comprises electrical signals corresponding to both the light pulses and the noise, has a substantially constant noise level 6*a*.

In FIG. 2, the broken line 6*d* indicates the trigger limit of indicator 8, which triggers only when a signal exceeds the level of said line. As a result of the constant noise control, electrical signals 6*a* corresponding to the noise can never reach the level 6*d*. Only electrical signals 6*c* corresponding to light can reach the trigger level 6*s*, so that manual control, with its possible faulty operation, is unnecessary.

The invention has particular application to cloud ceilometers because the reduction of amplification under bright steady light irradiation of the photocell 2 is no disadvantage due to the fact that in very bright weather a low level ceiling is hardly to be expected. During darkness, the receiver of the present invention has the additional advantage that the height of even very high clouds can be measured because of the low noise with high amplification.

In the development of the receiver of the present invention for cloud ceilometers, more particularly those in which the receiver moves through an angle as an automatic electronic theodolite, temperature compensation to above 100° C. is provided. Cloud ceilometers cannot be shielded against direct sunlight since such a shield would also restrict the area being measured. In summer, temperatures up to 100° C. may readily occur within the instrument. At such temperatures ordinary germanium transistors are unreliable and produce faulty signals because of high noise level. It is therefore necessary to use either nuvistors, that is, long life electronic tubes, or alternatively, NPN type silicon transistors, such as, for example, epitaxial planar transistors.

The temperature curve of the amplification of the noise or constant amplifier 5 in the positive temperature range can be balanced by negative feedback to provide constant amplification. However, additional steps are necessary to ensure operation in the negative temperature range, for example at —40° C. This entails heating the amplifier 5 and possibly the amplifier 6 to a temperature of for example 20° C. Conventional control techniques with contact switches cannot be used in such circumstances, because the sensitive wide band amplifier amplifies the closing of a contact as a signal.

In accordance with a further feature of the invention, a contactless temperature control system is used for thermostatic control, more particularly for thermostatic control of the amplifier 5. Such control system comprises, for example, an electrical bridge circuit including a thermistor for controlling the current intensity of a transistor, the working circuit of which includes a heating resistor. The operation of such temperature control system is contactless and non-spontaneous and provides smooth transition without producing noise or interference.

The receiver of the present invention may utilize an oscillographic indicator, that is, an oscillograph or oscilloscope 8*a*, or a recording unit 8*b* connected to the output of the indicator 8. The receiver of the present invention is mose effective if the light pulses have a very low repetition frequency, mainly below 100 c.p.s., compared with the noise, and are of negligibly low coulomb value as compared with the noise.

The invention may therefore be used to great advantage when the photoresponsive receiver is so energized or operated by light or laser pulses that there is no faulty triggering of the indicator in response to different types of noise. The invention may also be advantageously used for automatic weather stations.

In some cases the output voltage delivered by the constant or noise amplifier 5 may be further amplified by means of an additional D.C. amplifier having a nonlinear characteristic. The additional D.C. amplifier functions to compensate for variations in the amplification curve of the amplifier 5 and is connected between the output of the amplifier 5 and the control input of the amplifier 6.

The receiver of the present invention may be operated with the amplification of the constant amplifier 5 constant and independent of temperature and with the amplification to which the controllable amplifier 6 is set at any time constant and independent of temperature.

It should be noted that each of the components of the optical radiation pulse control receiver of the present invention may comprise any suitable arrangement known in the art. Thus, for example, a suitable constant amplifier 5 may comprise, for example, that shown and described in FIG. 3.15 and page 161, as a pulse amplifier Model 50, of "Electronics Experimental Techniques," by W. C. Elmore and M. Sands, McGraw-Hill Book Publishing Company, 1949, and a suitable controllable amplifier 6 may comprise, for example, that shown and described in FIG. 3.18 and page 167, as a pulse amplifier Model 500 of the same textbook. A suitable integrator 7 may comprise, for example, the current integration circuit shown and described in FIG. 7.4.9 and page 334 of "Millimicrosecond Pulse Techniques," Second Edition, by I. A. D. Lewis and F. H. Wells, Pergamon Press, 1959, and a suitable indicator 8 may comprise, for example, the high speed amplitude discriminator shown and described in FIG. 7.12 and page 287 of the same textbook.

While the invention has been described by means of a specific example and in a specific embodiment, I do not wish to be limited thereto, for obvious modifications will occur to those skilled in the art without departing from the spirit and scope of the invention.

What I claim is:

1. An optical radiation pulse control receiver for indicating light pulses from received light pulses and light noise of varying magnitude, comprising photoresponsive means irradiated by the received light pulses and light noise for converting said received light pulses and light noise into electrical signals corresponding to said received light pulses and electrical signals corresponding to said received noise signals, said photoresponsive means having an output;

controllable amplifier means connected to the output of said photoresponsive means responsive to the electrical signals corresponding to said received light pulses and said noise signals, said controllable amplifier means providing a constant amplification independent of temperature at each controlled setting thereof, said controllable amplifier means having an output;

constant amplifier means connected to the output of said photoresponsive means responsive to the electrical signals corresponding to said received light pulses and said noise signals, said constant amplifier means providing a constant amplification and producing a control voltage proportional to the magnitude of said noise, said constant amplifier means providing a constant amplification independent of temperature;

coupling means coupled between said constant amplifier means and said controllable amplifier means for applying said control voltage to said controllable amplifier means to maintain the voltage level of the noise at the output of said controllable amplifier means substantially constant; and indicating means connected to the output of said controllable amplifier means for indicating said electrical signals corresponding to said light pulses thereby indicating said received light pulses.

2. An optical radiation pulse control receiver for indicating light pulses from received light pulses and light noise of varying magnitude, comprising photoresponsive means irradiated by the received light pulses and light noise for converting said received light pulses and light noise into electrical signals corresponding to said received light pulses and electrical signals corresponding to said received noise signals, said photoresponsive means having an output;

controllable amplifier means connected to the output of said photoresponsive means responsive to the electrical signals corresponding to said received light pulses and said noise signals, said controllable amplifier means having an output;

constant amplifier means connected to the output of said photoresponsive means responsive to the electrical signals corresponding to said received light pulses and said noise signals, said constant amplifier means providing a constant amplification and producing a control voltage proportional to the magnitude of said noise, said constant amplifier means comprising transistor means and electrical bridge means including thermistor means for controlling current flow to said transistor means;

coupling means coupled between said constant amplifier means and said controllable amplifier means for applying said control voltage to said controllable amplifier means to maintain the voltage level of the noise at the output of said controllable amplifier means substantially constant; and indicating means connected to the output of said controllable amplifier means for indicating said electrical signals corresponding to said light pulses thereby indicating said received light pulses.

3. An optical radiation pulse control receiver for indicating light pulses from received light pulses and light noise of varying magnitude, comprising photoresponsive means irradiated by the received light pulses and light noise for converting said received light pulses and light noise into electrical signals corresponding to said received light pulses and electrical signals corresponding to said received noise signals, said photoresponsive means having an output;

controllable amplifier means connected to the output of said photoresponsive means responsive to the electrical signals corresponding to said received light pulses and said noise signals, said controllable amplifier means having an output;

constant amplifier means connected to the output of said photoresponsive means responsive to the electrical signals corresponding to said received light pulses and said noise signals, said constant amplifier means providing a constant amplification and producing a control voltage proportional to the magnitude of said noise, each of said constant amplifier means and said controllable amplifier means comprising epitaxial planar silicon transistor means;

coupling means coupled between said constant amplifier means and said controllable amplifier means for applying said control voltage to said controllable amplifier means to maintain the voltage level of the noise at the output of said controllable amplifier means substantially constant; and indicating means connected to the output of said controllable amplifier means for indicating said electrical signals corresponding to said light pulses thereby indicating said received light pulses.

4. A cloud ceilometer receiver comprising, in combination, photoresponsive means irradiated by combined light pulse signals and light noise and converting said light pulse signals and light noise into corresponding electrical signals; controllable gain amplifier means connected to the output of said photoresponsive means for amplifying said electrical signals with variable gain depending upon the state of a control signal applied to said controllable gain amplifier; constant gain amplifier means ocnnected to the output of said photoresponsive means for amplifying said combined electrical signals with constant gain; integrating means connected to the output of said constant gain amplifier means and integrating said combined electrical signals over time, said integrating means applying to said controllable gain amplifier means said control signal to maintain the voltage level of the noise at the output of said controllable amplifier means substantially constant, said control signal being a function of the time integral of said electrical signals, said controllable amplifier means providing constant amplification at each controlled setting thereof; and indicating means connected to the output of said controllable gain amplifier means and including threshold means for indicating only said electrical signals above a predetermined level, the gain of said controllable gain amplifier means being decreased with increase in the time integral of said electrical signals and being increased with decrease of said time integral so that said indicating means indicate substantially only the electrical signals corresponding to said light pulses and excludes the electrical signals corresponding to said noise signals.

5. A cloud ceilometer receiver for indicating light pulses from received light pulses and light noise of varying magnitude, comprising photoresponsive means irradiated by the received light pulses and light noise for converting said received light pulses and light noise into electrical signals corresponding to said received light pulses and electrical signals corresponding to said received noise signals, said photoresponsive means having an output; controllable amplifier means connected to the output of said photoresponsive means responsive to the electrical signals corresponding to said received light pulses and said noise signals, said controllable amplifier means providing a constant amplification at each controlled setting thereof, said controllable amplifier means having an output; constant amplifier means connected to the output of said photoresponsive means responsive to the electrical signals corresponding to said received light pulses and said noise signals, said constant amplifier means providing a constant amplification and producing a control voltage proportional to the magnitude of said noise, said constant amplifier means providing a constant amplification; coupling means coupled between said constant amplifier means and said controllable amplifier means for applying said control voltage to said controllable amplifier means to maintain the voltage level of the noise at the output of said controllable amplifier means substantially constant; and indicating means connected to the output of said controllable amplifier means for indicating said electrical signals corresponding to said light pulses thereby indicating said received light pulses.

6. The cloud ceilometer receiver as defined in claim 4 wherein said integrating means include a rectifying diode with anode connected to said constant gain amplifier means and cathode connected to said controllable gain amplifier means.

7. The cloud ceilometer receiver as defined in claim 4 including recording means for recording the electrical signals indicated by said indicating means.

8. The cloud ceilometer receiver as defined in claim 4 including oscilloscope means for visually displaying the electrical signals indicated by said indicating means.

(References on following page)

References Cited

UNITED STATES PATENTS

| | | | |
|---|---|---|---|
| 2,682,798 | 7/1954 | Schock. | |
| 2,971,164 | 2/1961 | Saari | 33—17 X |
| 3,013,855 | 12/1961 | Lapinski et al. | |
| 3,046,554 | 7/1962 | Brumley. | |
| 3,147,381 | 9/1964 | Lowenstein | 250—83.3 |
| 3,161,771 | 12/1964 | Engborg et al. | 250—83.3 |
| 3,193,681 | 7/1965 | Schwartz | 178—6.8 X |
| 3,222,609 | 12/1965 | Ulmer et al. | 330—136 X |
| 3,244,059 | 4/1966 | Simpkins. | |
| 3,251,996 | 5/1966 | Johnson et al. | 250—83.3 |
| 3,353,022 | 11/1967 | Schwartz | 250—83.3 |
| 3,353,103 | 11/1967 | Berry et al. | 330—143 X |
| 3,361,912 | 1/1968 | Lundberg. | |

OTHER REFERENCES

"Millimicrosecond Pulse Techniques," by Lewis and Wells, sec. 7.5.1, fig. 7.12, pp. 286–287, Pergamon Press, 1959.

ROY LAKE, Primary Examiner

R. J. WEBSTER, Assistant Examiner

U.S. Cl. X.R.

33—17; 178—6.8; 250—83.3; 356—4